Jan. 27, 1925. Re. 15,988
T. ASTON
RETAINING WALL, BULKHEAD, WHARF WALL, AND THE LIKE
Original Filed March 18, 1921
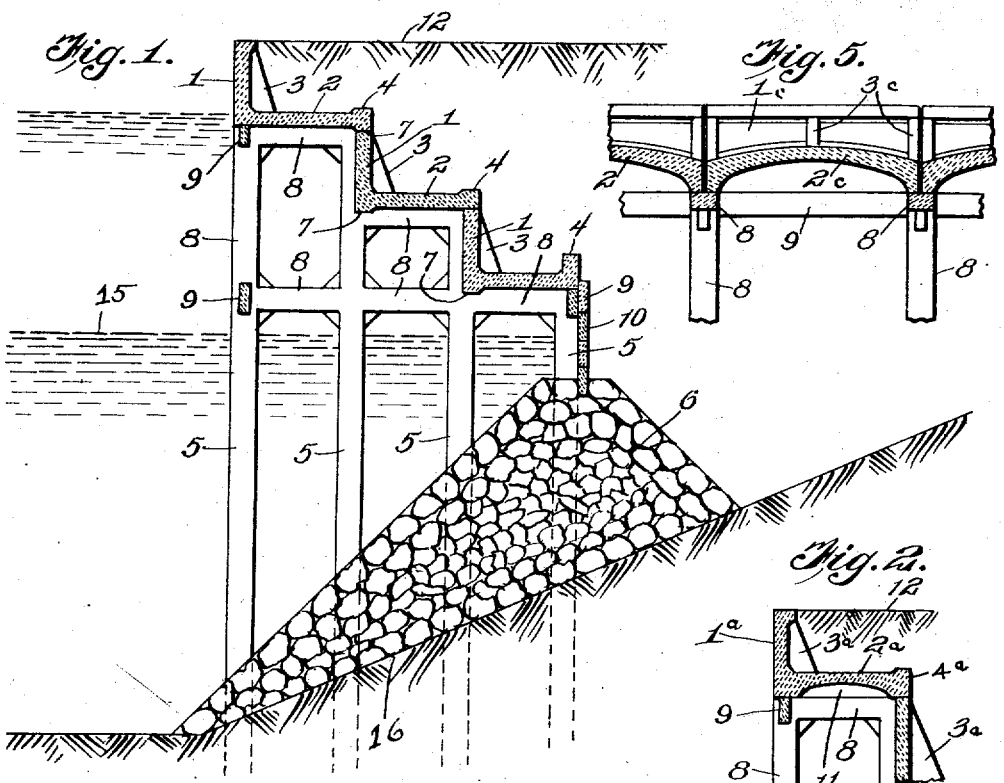
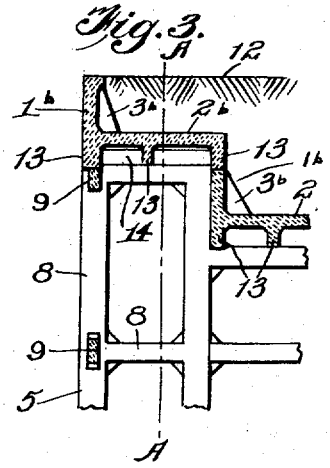
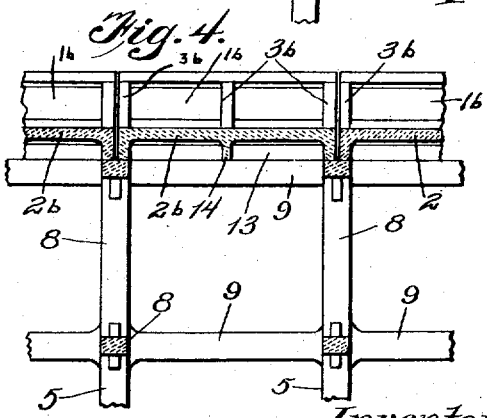
Inventor
Taggart Aston
T. J. Geisler
Atty Reissued Jan. 27, 1925.

Re. 15,988

UNITED STATES PATENT OFFICE.

TAGGART ASTON, OF PORTLAND, OREGON.

RETAINING WALL, BULKHEAD, WHARF WALL, AND THE LIKE.

Original No. 1,392,616, dated October 4, 1921, Serial No. 453,331, filed March 18, 1921. Application for reissue filed October 2, 1923. Serial No. 666,199.

*To all whom it may concern:*

Be it known that I, TAGGART ASTON, a citizen of the United States, and a resident of Portland, county of Multnomah and State of Oregon, have invented a new and useful Improvement in Retaining Walls, Bulkheads, Wharf Walls, and the like, of which the following is a specification.

The object of my invention is to provide a type of bulb-head or retaining wall in which maximum economy is attained by limiting the amounts of both back-filling material and structural material involved in the wall itself to such proportions or quantities as will suffice for the stability of the structure with due allowance for the unit working stresses and foundation pressures or pile loads.

To attain the above object, I provide a special type of bulk-head or retaining wall in which the weight of every cubic foot of back-filling material superimposed on the structure is utilized to the utmost advantage, in efficiently stabilizing the structure against the horizontal pressure exerted by the embankment or fill; and, at the same time providing a structure wherein only that amount of back-filling material is superimposed as is necessary to provide the mass, or weight, required to render the structure statically stable under the external forces considered.

I further attain my object by providing a type of structure which in itself contains no more structural material than is necessary to retain the fill, and transmit the vertical and horizontal pressures of the same to the foundation without overstressing any portion of the structure. By my invention the necessary weight or mass is practically all provided by the superimposed fill, which is ordinarily much cheaper in cost than the structural material.

My invention also provides economy by minimizing the foundation pressure, especially that directly under the toe of the structure, where foundation pressure, under the usual types of retaining walls, dams, or bulk-heads, is frequently excessive, and requires the footings to be extended, and the structure as a whole given uneconomical proportions in order that the safe unit foundation pressure be not exceeded.

My invention furthermore incorporates the advantages of an inclined apron or back wall, in which the weight of the superimposed fill adds to the stability of the structure. In short, my invention tends to overcome the usual disadvantages and uncertainties of the smooth or plane sloped wall, by stepping said wall into horizontal and vertical sections, so as to consider only the direct horizontal and vertical pressures of the fill, and disregard the friction between the fill and the surface of the wall. The amount of this friction is always more or less unknown, and may be so small that superimposed fill will exert considerable wedging action against a smooth wall. Such wedging action I eliminate by the stepped-down construction of my wall above mentioned.

Furthermore by combining with the said stepped wall a support consisting of pile and light frame bents, in which only a nominal amount of capping and cross-bracing is required to render the substructure sufficiently rigid and stable for resisting lateral forces—particularly the outward force due to the horizontal thrust of the embankment, I provide a retaining wall not only structurally safe, but also one more economical than other skeleton or open types.

The spacing of the bents and size of piles and cross members are entirely matters of structural design and will of course vary with the total height of the wall and the character of the embankment material.

It is further my object to provide a structure that will permit the use of concrete as the construction material to compete more closely as to cost with structures built wholly or partly of timber.

It is further my object to provide a structure that will consist of a series of small stepped down vertical retaining walls and horizontal relieving platforms in which the small retaining walls also serve as girders or abutments to support the relieving platforms next superimposed; and also, by reason of being stepped down in series, to afford a total combined cross sectional area, and cost materially less than if only one high retaining wall and one relieving platform had been provided to contain the superimposed filling.

It is further my object to provide a structure that will consist of a series of stepped down retaining walls and relieving platforms of reinforced concrete that can be cast or molded in convenient lengths or units prior to being placed on the substructure of pile or frame bents, which latter could also be pre-cast for that portion above low water and superimposed and cast or molded to join with the piles after the latter had been placed in position.

I attain these objects with the structure illustrated in the accompanying drawings, in which—

Fig. 1 is a vertical cross section of a preferred form of my invention applied in the construction of a wharf;

Figs. 2 and 3 are vertical cross sections of optional constructions of the horizontal sections or relieving platforms;

Fig. 4 is a sectional view of Fig. 3 taken on the line A—A, and

Fig. 5 is a longitudinal, vertical section of another optional form of the relieving platforms.

1, $1^a$, $1^b$ and $1^c$ are the vertical members of the sectional stepped-down bulkhead.

2, $2^a$, $2^b$, and $2^c$ are the relieving platforms of said bulkhead.

3, $3^a$, $3^b$ and $3^c$ are counterforts strengthening members 1, $1^a$, $1^b$, and $1^c$.

4 and $4^a$ are upwardly projecting longitudinal ribs along the outer edge of platforms 2 and $2^a$ in Figs. 1 and 2.

5, 5 are piles driven into the ground, and adapted to support the bulkhead, said piles are shown as being made of concrete. These piles preferably extend about three feet above low water.

6, is a mound or bulkhead of rubble beneath said wharf and around the feet of piles 5, the ridge of which rises to near low water mark.

7, 7 are longitudinal ribs on the bottom of relieving platforms 2, in Fig. 1 projecting downwardly to engage with notches in bents 8.

8, 8 are the bents of the structure mounted on the piles 5, and are shown as integral therewith.

9, 9 are longitudinal struts connecting and bracing bents 8. All the members of said structure are preferably made of reinforced concrete.

10 is sheeting fastened to the inner row of piles and bearing on the rubble bulkhead and on the lowest relieving platform 2.

11, 11 are transverse ribs on the lower side of relieving platforms $2^a$ shown in Fig. 2.

12 is a wharf floor, or fill superimposed behind the bulkhead.

13, 13 are longitudinal strengthening ribs on the lower sides of relieving platforms $2^b$, shown in Figs. 3 and 4.

14 is a transverse strengthening rib on the lower side of relieving platform $2^b$ shown in Figs. 3 and 4.

15 indicates water in front of the bulkhead, in the wharf structure and 16 is the ground, as naturally formed.

The stepped-down bulkhead is preferably molded in L-shaped units consisting of a vertical member and a horizontal member.

These units are mounted in place, engaged with the bents 8 and bear on each other, the steps being arranged to progress downwardly towards the rear edge or "heel" of the structure. The surfaces of the steps which are in contact are preferably cemented together with cement grouting. When the several steps are thus mounted and cemented together, a bulkhead is had which not only is well able to resist forces acting against the front of the wall, but also is well able to bear the weight of the element 15 retained behind the wall, together with the load that may from time to time be placed on the top of the element retained or on the floor surface 12. As is readily understood, it is not necessary that the steps be pre-cast. The structures as shown are preferably connected into a single unit forming a light and inexpensive structure, which is well adapted to resist any forces acting against its front, as well as those resulting from the weight of the element retained behind the bulkheads and any load supported thereby.

The pressure resulting from the weight of any given quantity of the element retained by the stepped down bulkhead is supported by the relieving platform directly underneath. That is, I have arranged these relieving platforms in steps which support the column of retained element directly above it and these steps are arranged horizontally to present a surface normal to the load. These steps are connected by vertical members which are integral with the lower step and connected thereto at their bottom edges.

Any tendency of the retained element to move horizontally against the bulkhead is checked by any or all of these vertical sections. This horizontal force against these vertical members tends to overturn each unit about the corner formed by the juncture of the horizontal and vertical portions and this tendency to overturn is counteracted by the force exerted by the weight of the element retained on each relieving platform. The force exerted by the weight of the element retained is usually greater than the tendency of the retained element to shift laterally but to provide a margin of safety, I preferably make the relieving platform slightly wider than the vertical member. By the above method of construction of the stepped apron or bulkhead wall, the latter though cast in sections, acts in its entirety as a unit.

If the retained element is earth or sand or other similar shifting solid material, as differentiated with water, I provide the longitudinal rib 4 on the outer edge of the relieving platform which extends upwardly therefrom and thus forms a cupped surface for the relieving platform which requires the actual displacement of the entire column of fill before the horizontal force attains the ascendency.

The counterforts 3 are provided to connect and strengthen the relieving platforms relatively with their vertical members so as to prevent a fracture at their jointure caused by the tendency of the retained element to shift laterally.

I claim:

1. A structure of the character described comprising an open substructure consisting of piles driven into the ground, and frame-bents mounted on said piles, and a bulkhead wall comprising a plurality of steps extending down rearwardly and supported by said frame bents, the substructure adapted to support the steps of said wall against horizontal and vertical pressures and including cross bracing and longitudinal bracing, the steps of said wall arranged to locate the centre of mass of the filling material over the rear portion of the wall.

2. A structure of the character described comprising an open substructure consisting of piles driven into the ground, and frame-bents mounted on said piles, and a bulkhead wall composed of a plurality of precast sections arranged in steps extending downward and rearward, the substructure adapted to support the steps of said wall against horizontal and vertical pressures and including cross bracing and longitudinal bracing, the steps of said wall being adapted to locate the centre of mass of the filling material over the rear portion of the wall.

3. A structure of the character described comprising an open substructure consisting of piles driven into the ground, and frame-bents mounted on said piles, and a bulkhead wall composed of a plurality of sections each composed of horizontal and vertical integral members, said sections arranged in steps extending downward and rearward with the outer edge of the horizontal member of one section supported on the vertical member of an adjacent section, the substructure arranged to conform with and support the horizontal and vertical members of said steps and including cross-bracing and longitudinal bracing, the steps of said wall being adapted to locate the centre of mass of the filling material over the rear portion of the wall.

4. A structure of the character described comprising an open substructure consisting of piles driven into the ground, and frame-bents mounted on said piles, and a bulkhead wall composed of a plurality of sections each composed of horizontal and vertical integral members, said sections arranged in steps extending downward and rearward with the outer edge of the horizontal member of one section supported on the vertical member of an adjacent section, upstanding ribs provided on the outer edges of said horizontal members, the substructure arranged to conform with and support the horizontal and vertical members of said steps and including cross bracing and longitudinal bracing, the steps of said wall being adapted to locate the centre of mass of the filling material over the rear portion of the wall.

5. A structure of the character described comprising an open substructure consisting of piles driven into the ground and frame-bents mounted on said piles, and a bulkhead wall composed of a plurality of precast sections each composed of horizontal and vertical integral members, said sections arranged in steps extending downward and rearward with the outer edge of the horizontal member of one section supported on the vertical member of an adjacent section, the substructure arranged to conform with and support the horizontal and vertical members of said steps, and including cross-bracing and longitudinal bracing, the steps of said wall being adapted to locate the centre of mass of the filling material over the rear portion of the wall.

TAGGART ASTON.